(12) United States Patent
Choy et al.

(10) Patent No.: US 7,542,981 B2
(45) Date of Patent: Jun. 2, 2009

(54) METHODS AND APPARATUS FOR PARALLEL EXECUTION OF A PROCESS

(75) Inventors: Long Yin Choy, Hong Kong (CN); Alan Edelman, Newton, MA (US); Parry Jones Reginald Husbands, Albany, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 440 days.

(21) Appl. No.: 11/262,475

(22) Filed: Oct. 28, 2005

(65) Prior Publication Data

US 2006/0101050 A1 May 11, 2006

Related U.S. Application Data

(60) Provisional application No. 60/623,682, filed on Oct. 29, 2004.

(51) Int. Cl.
*G06F 17/00* (2006.01)
*G06F 15/16* (2006.01)
*G06F 9/45* (2006.01)

(52) U.S. Cl. .................. 707/101; 707/100; 709/203; 717/149

(58) Field of Classification Search .............. 707/100, 707/101; 709/203; 717/149
See application file for complete search history.

(56) References Cited

U.S. PATENT DOCUMENTS

| | | | | |
|---|---|---|---|---|
| 5,191,649 A | * | 3/1993 | Cadambi et al. | 709/225 |
| 5,664,151 A | * | 9/1997 | Galles et al. | 711/145 |
| 5,740,371 A | * | 4/1998 | Wallis | 709/229 |
| 5,867,706 A | * | 2/1999 | Martin et al. | 718/105 |
| 6,292,822 B1 | * | 9/2001 | Hardwick | 718/105 |
| 6,298,370 B1 | * | 10/2001 | Tang et al. | 718/102 |
| 6,338,095 B1 | * | 1/2002 | Yasuda et al. | 709/250 |
| 7,043,309 B2 | * | 5/2006 | Jackson et al. | 700/19 |
| 2003/0002447 A1 | * | 1/2003 | Jackson et al. | 370/254 |

OTHER PUBLICATIONS

Tawbi, Nadia, et al., "Processor Allocation and Loop Scheduling on Multiprocessor Computers", ICS '92, Washington, DC, Jul. 19-24, 1992, pp. 63-71.*
Rauber, Thomas, et al., "Library Support for Hierarchical Multi-Processor Tasks", SC 2002, Nov. 16-22, 2002, pp. 45-54.*
Colajanni, Michele, et al., "DAME: An Environment for Preserving the Efficiency of Data-Parallel Computations on Distributed Systems", IEEE Concurrency, Jan.—Mar. 1997, pp. 41-55.*

(Continued)

*Primary Examiner*—John E Breene
*Assistant Examiner*—Robert Stevens
(74) *Attorney, Agent, or Firm*—Wolf, Greenfield & Sacks, P.C.

(57) ABSTRACT

One embodiment of the invention is directed to executing a computer program that manipulates data stored in a distributed manner on a parallel server. At least one portion of the computer program treats the data from a global perspective, wherein commands to the parallel server are not specific to the manner in which the data is distributed on the parallel server. In addition, at least one portion of the computer program treats the data from a local perspective, wherein commands to the parallel server are specific to the manner in which the data is distributed on the parallel server.

59 Claims, 9 Drawing Sheets

OTHER PUBLICATIONS

Squyres, Jeffrey M., et al., "The Component Architecture of Open MPI: Enabling Third-Party Collective Algorithms", Proc. of the Workshop on Component Models and Systems for Grid Applications, Saint Malo, France, Jun. 26, 2004, pp. 167-185.*

Sunderam, V. S., et al., "Heterogeneous Parallel and Distributed Computing", Parallel Computing, vol. 25, Issues 13-14, Dec. 1999, pp. 1699-1721.*

Morin, Steven Raymond, "JMPI: Implementing the Message Passing Interface Standard in Java", Masters Thesis, Univ. of Massachusetts @ Amherst, Sep. 2000, pp. i-ix and 1-67.*

Petcu, Dana, "Solving Initial Value Problems with Parallel Maple Processes", Euro-Par 2001, LNCS 2150, Springer-Verlag, Heidelberg, Germany, © 2001, pp. 926-934.*

Agrawal, Rajeev, "Peer-to-Peer Support for MATLAB-Style Computing", Masters Thesis, Texas A&M Univ., May 2004, pp. i-vii and 1-52.*

Kale, Laxmikant V., et al., "CHARM++: A Portable Concurrent Object Oriented System Based on C++", ACM SIGPLAN Notices, vol. 28, Issue 10, Oct. 1993, pp. 91-108.*

Aldinucci, M., et al., "An Advanced Environment Supporting Structured parallel Programming in Java", Future Generation Computer Systems, vol. 19, Issue 5, Jul. 2003, pp. 611-626.*

Kneip, J., et al., "Architecture and C++ Programming Environment of a Highly Parallel Image Signal Processor", Microprocessing and Microprogramming, vol. 41, Issues 5-6, Oct. 1995, pp. 391-408.*

Paulin, Pierre G., et al., "Parallel Programming Models for a Multi-Processor SoC Platform Applied to High-Speed Traffic Management", CODES + ISSS '04, Stockholm, Sweden, Sep. 8-10, 2004, pp. 48-53.*

Narasimhan, P., et al., "Replica Consistency of CORBA Objects in Partitionable Distributed Systems", Distrib. Syst. Engng., vol. 4, © 1997, pp. 139-150.*

Allan, Benjamin A., et al., "The CCA Core Specification in a Distributed Memory SPMD Framework", Concurrency and Computation: Practice and Experience, vol. 15, Issue 5, © 2002, pp. 323-345.*

Tramberend, Henrik, "Avocado: A Distributed Virtual Reality Framework", Virtual Reality, Mar. 13-17, 1999, pp. 14-21.*

Geist, G. A., et al., "PVM and MPI: A Comparison of Features", Calculateurs Paralleles, vol. 8, No. 2, © 1996, pp. 1-16.*

Campione, Mary, et al., The Java Tutorial, 3rd Edition: A Short Course on the Basics, Addison-Wesley, Boston, MA, © 2001, pp. 2-3 and 185-187.*

Deitel, H. M., et al., Java: How to Program, 2nd Edition, Prentice Hall, Upper Saddle River, NJ, © 1998, pp. 9-11, 15 and 294-295.*

Trefethen, Anne E., et al., "MultiMATLAB: MATLAB on Multiple Processors", Technical Report 96-239, Cornell Theory Center, © 1996, 16 pages.*

Choy, Ron, et al., "MATLAB*P 2.0: A Unified Parallel MATLAB", DSpace at MIT, Jan. 2003, 6 pages.*

Choy, Long Yin, "MATLAB*P 2.0: Interactive Supercomputing Made Practical", Masters Thesis, Massachusetts Institute of Technology, Sep. 2002, pp. 1-67.*

Chen, Ying, et al., "MATLAB*G: A Grid-Based Parallel MATLAB", DSpace@MIT, Jan. 2004, pp. 1-7.*

Husbands, Parry, et al., "Interactive Supercomputing with MIT Matlab", DSpace@MIT, Jul. 28, 1998, pp. 1-10.*

Springer, Paul L., "Matpar: Parallel Extensions for MATLAB", BEACON eSpace, JPL TRS 1992+, Jul. 13, 1998, pp. 1-5.*

International Search Report from International Patent Application No. PCT/US2005/039041, pp. 1-4.

Anonymous: "LCR 2004—Technical Program" Seventh Workshop on Languages, Compilers and Run-Time Systems For Scalable Computers (LCR 2004) Web Site, [Online] Oct. 27, 2004, XP002375720, pp. 1-4.

Fraguela B. et al.: "The Hierarchically Tiled Arrays Programming Approach" Paper Presented At The Seventh Workshop On Languages, Compilers and Run-Time Systems For Scalable Computers (LCR 2004) Oct. 21-23, 2004—Houston, Texas, USA [Online] Oct. 27, 2004, XP002375714, pp. 1-12.

Choy R., Edelman, A.: "Solving Multiple Classes of Problems in Parallel With MATLAB*P" Singapore-MIT Alliances (SMA)—Computer Science (CS) Collection, Jan. 2004, XP002373293, pp. 1-6.

Dongarra J.: "Jack Dongarra—Papers"Internet Page, [Online] Feb. 29, 2004, XP002375782, 1 page.

Luszczek P., Dongarra J.: "Design of Interactive Environment for Numerically Intensive Parallel Linear Algebra Calculations" Paper to be Presented at the International Conference on Computational Science 2004 (ICCS 2004) Jun. 6-9, 2004 Krakow Poland, [Online] Feb. 29, 2004, XP002375715, pp. 1-10.

Husbands P., Isbell C., Edelman, A.: "Interactive Supercomputing with MIT Matlab" DSPACE at MIT—Computer Science and Artificial Intelligence Lab (CSAIL) Artificial Intelligence Lab Publications—AI MEMOS (1959-2004), [Online] No. AIM-1642, Jul. 28, 1998 XP002375716, pp. 1-10.

Menon Y. et al.: "MultiMATLAB: integrating MATLAB with high-performance parallel computing" Proceedings of the 1997 ACM/IEEE SC97 Conference ACM New York, NY, USA, 1997, XP002373292 ISBN: 0-89791-985-8, pp. 1-18.

Husbands P., et al.: "The parallel problems server: a client-server model for interactive large scale scientific computation" Vector and Parallel Processing—Vecpar '98. Third International Conference. Selected Papers and Invited Talks Springer-Verlag Berlin, Germany, 1999, pp. 156-169, XP002373294 ISBN: 3-540-66228-6.

* cited by examiner

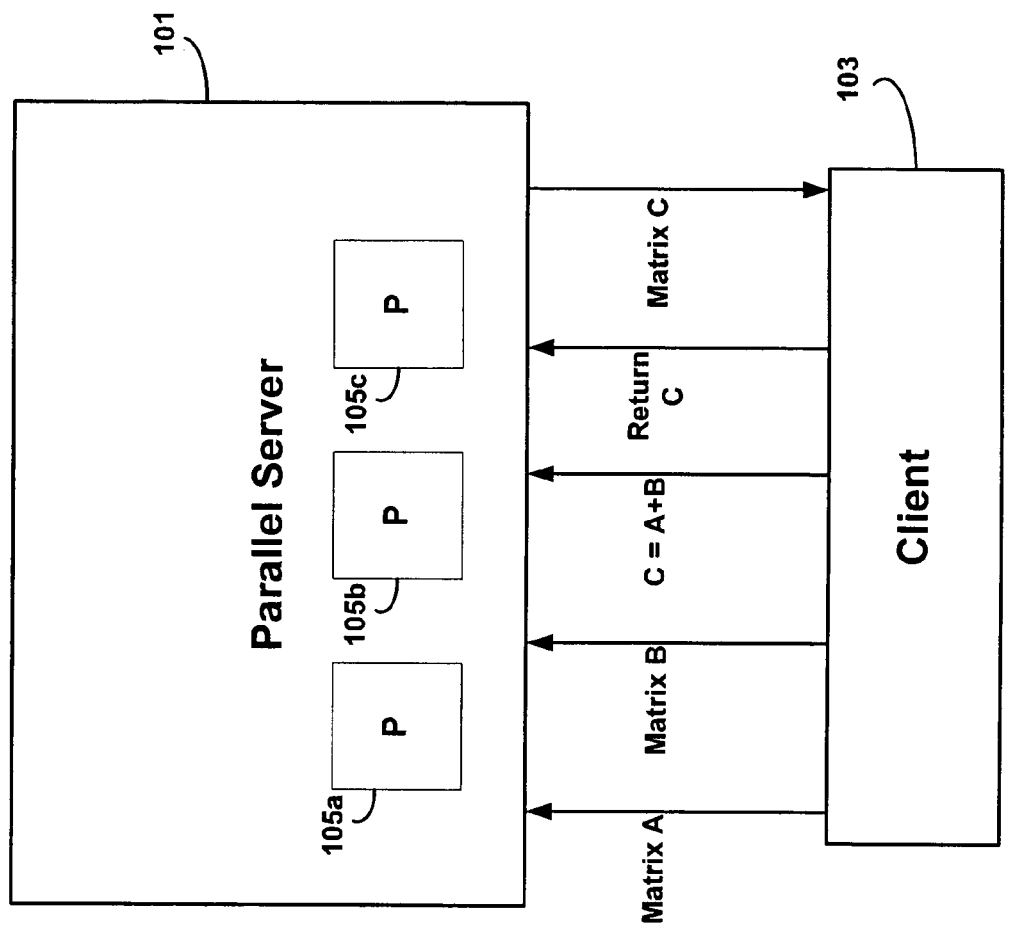

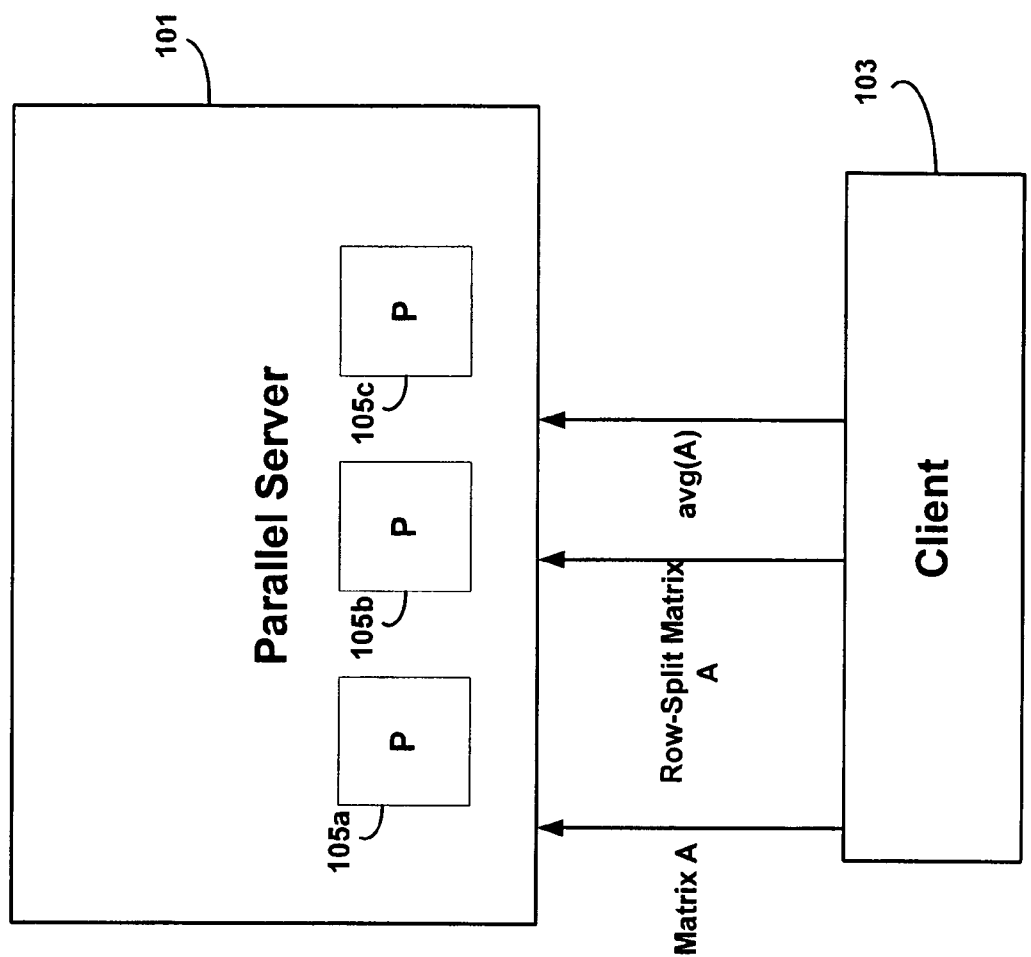

METHODS AND APPARATUS FOR PARALLEL EXECUTION OF A PROCESS

CROSS REFERENCE TO RELATED APPLICATIONS

This application claims the benefit under 35 U.S.C. §119 (e) of co-pending U.S. Provisional Application Ser. No. 60/623,682, filed Oct. 29, 2004, entitled "A Method And System For An Interactive Parallel Programming Environment" by Long Yin Choy, et. al., the contents of which are incorporated herein by reference.

FIELD OF THE INVENTION

The present invention relates to providing parallel processing capability.

DESCRIPTION OF THE RELATED ART

Parallel computing is the concurrent use of multiple processors to solve a computational problem. Large problems may take significant time to solve or may be impossible to solve using only a single processor. Thus, such problems may be divided among multiple processors, each of which solves a portion of the problem.

However, writing program code to solve a computational problem in parallel may present challenges. For example, a programmer may have to devise a complex algorithm to determine an efficient way in which to divide the problem up among the multiple processors, how memory should be allocated and shared among these processors, and how messages should be passed between processors.

As used herein, the term "computer program" refers to a related set of statements or instructions to be used directly or indirectly in a computer in order to bring about a certain result. Different portions of the same computer program may be stored in different files and/or on different computers.

The programmer may also wish to employ pre-existing parallel computing software packages, such as, for example, parallel virtual machine (PVM) or message passing interface (MPI) packages, so that routines for sharing data between processors, spawning additional processes, and other general parallel computing tasks need not be coded from scratch. Thus, the programmer may have to be familiar with such software packages.

SUMMARY

One aspect of the invention is directed to a method of processing a computer program that manipulates a data structure stored on a parallel server comprising a plurality of processors, wherein a portion of the data structure is stored on each of the plurality of processors. The method comprises acts of: (a) executing a first routine based on code in the computer program that causes a first request to perform a first operation on the data structure to be sent to the parallel server, wherein the first routine is a routine that overloads a serial routine that, when executed, causes the first operation to be performed serially; and (b) executing a second routine based on code in the computer program that causes a second request to be sent to the parallel server, wherein the second request includes an instruction to at least one specific processor of the plurality of processors to perform a second operation on the portion of the data structure stored on the at least one specific processor. Another aspect is directed to at least one computer readable medium encoded with instructions that, when executed on a computer system, perform the above-described method.

A further aspect is directed to a computer that executes a computer program for manipulating a data structure stored on a parallel server comprising a plurality of processors, wherein a portion of the data structure is stored on each of the plurality of processors. The computer comprises: an output for sending data to the parallel server; and at least one controller, coupled to the output that: (a) executes a first routine based on code in the computer program that causes a first request to perform a first operation on the data structure to be sent to the parallel server, via the output, wherein the first routine is a routine that overloads a serial routine that, when executed, causes the first operation to be performed serially; and (b) executes a second routine based on code in the computer program that causes a second request to be sent to the parallel server, via the output, wherein the second request includes an instruction to at least one specific processor of the plurality of processors to perform a second operation on the portion of the data structure stored on the at least one specific processor.

Another aspect is directed to a method of processing a computer program written in an interpreted programming language that manipulates a data structure stored on a parallel server comprising a plurality of processors, wherein a portion of the data structure is stored on each of the plurality of processors. The method comprises acts of: (a) executing a first routine based on code in the computer program that causes a first request to perform a first operation on the data structure to be sent to the parallel server; and (b) executing a second routine based on code in the computer program that causes a second request to be sent to the parallel server, wherein the second request includes an instruction to at least one specific processor of the plurality of processors to perform a second operation on the portion of the data structure stored on the at least one specific processor. A further aspect is directed to at least one computer readable medium encoded with instructions that, when executed on a computer system, perform the above-described method.

Another aspect is directed to a computer that executes a computer program written in a interpreted programming language for manipulating a data structure stored on a parallel server comprising a plurality of processors, wherein a portion of the data structure is stored on each of the plurality of processors. The computer comprises: an output for sending data to the parallel server; and at least one controller, coupled to the output that: (a) executes a first routine based on code in the computer program that causes a first request to perform a first operation on the data structure to be sent to the parallel server, via the output; and (b) executes a second routine based on code in the computer program that causes a second request to be sent to the parallel server, via the output, wherein the second request includes an instruction to at least one specific processor of the plurality of processors to perform a second operation on the portion of the data structure stored on the at least one specific processor.

A further aspect is directed to a method of processing a computer program that manipulates a data structure stored on a parallel server comprising a plurality of processors, wherein a portion of the data structure is physically stored on each of the plurality of processors. The method comprises acts of: (a) executing a first routine based on code in the computer program that causes a first request to perform a first operation on the data structure to be sent to the parallel server; and (b) executing a second routine based on code in the computer program that causes a second request to be sent to the parallel server, wherein the second request defines an abstract splitting of the data structure that defines a plurality of abstract portions of the data structure, and wherein the second request includes an instruction to perform a second operation on at least one of the plurality of abstract portions.

BRIEF DESCRIPTION OF THE DRAWINGS

FIG. 1A is a block diagram of a system in which global operations on data may be performed;

FIG. 1B is a block diagram of a system in which local operations on data may be performed;

DETAILED DESCRIPTION

Figure 2:
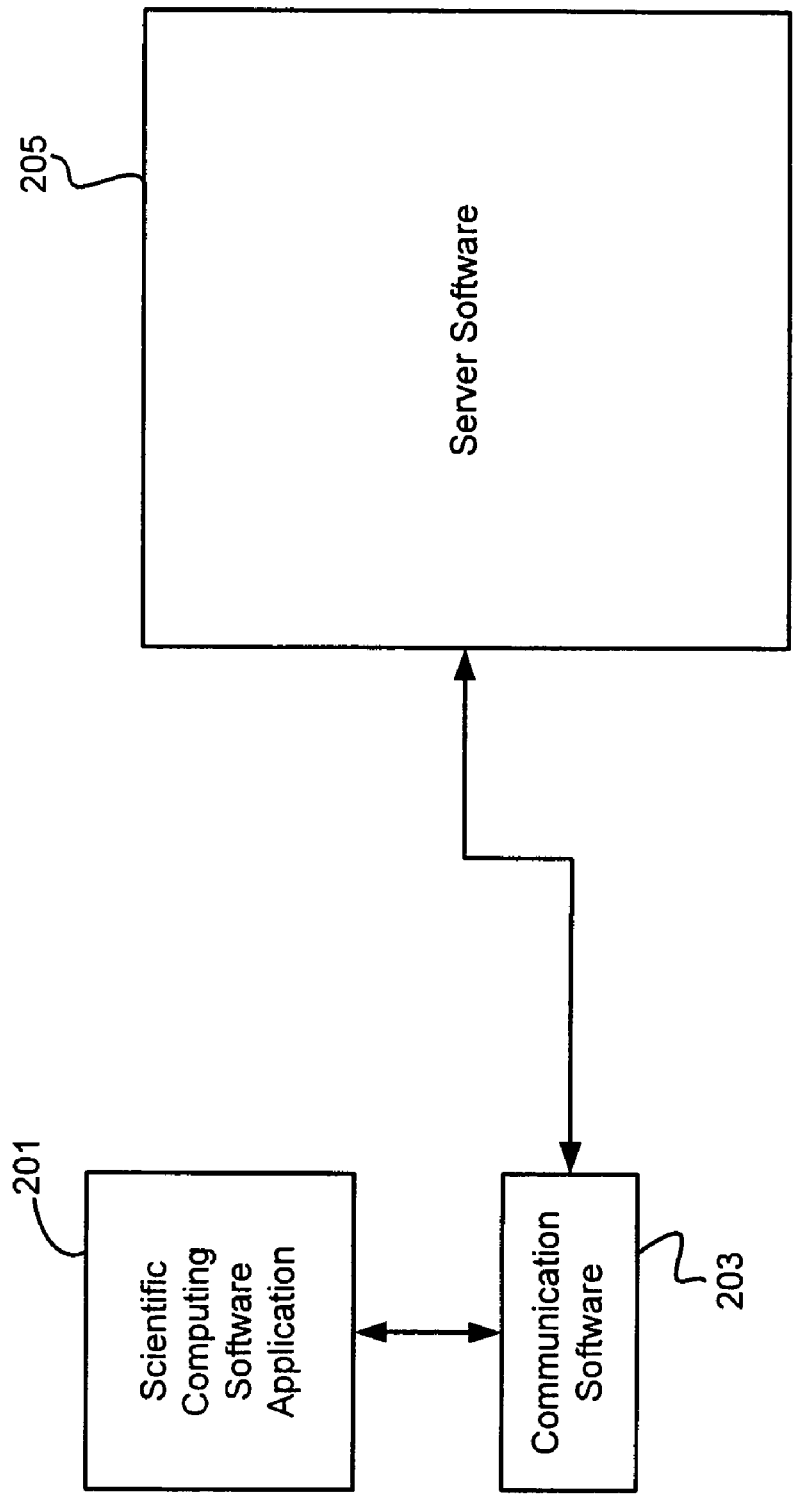
FIG. 2 is a block diagram of a system adaptable to perform a process of a scientific computing software application in parallel, in accordance with some embodiments for practicing the teachings herein.

Many programmers have existing computer programs or computer code that was originally designed to be run serially (i.e., on a single processor). Applicants have appreciated that it often may be desirable to use such serial computer program code in the context of a parallel computing platform, to take advantage of parallel processing capabilities. Achieving this goal, however, is non-trivial.

More specifically, Applicants have appreciated that, in a parallel computing environment, a user may wish to treat data in different ways within the same parallel program. Thus, a user may wish to take a "global" view of the data, in which an object stored on the parallel server is viewed by the user as a single object, even though the object may be distributed across multiple processors of the parallel computer. As used herein, the term "processor" refers to a processor core and its associated components. Thus, a single integrated circuit or chip that has multiple processor cores may be considered to be multiple processors. Thus, for example, an integrated circuit or chip with two processor cores may be considered to be two processors, an integrated circuit or chip with four processor cores may be considered to be four processors, and an integrated circuit or chip with n processor cores may be considered to be n processors.

Thus, the user need not be aware of how the object is distributed amongst the multiple processors of the parallel server or what action each individual processor takes to perform an operation on the object in parallel. An example of a series of global view operations is provided in FIG. 1A.

The system of FIG. 1A includes a parallel server 101 and a client 103, which sends commands to and receives results from parallel server 101. Parallel server 101 includes three processors, 105a, 105b, and 105c, though a user sending global view commands to parallel server 101 through client 103 need not be aware of the number of processors being used in parallel server 101. As shown in FIG. 1A, client 103 may create a Matrix A on parallel server 101, which may be, for example, a 3×2 matrix of integer values. Parallel server 101 may distribute the data of Matrix A amongst processors 105a, 105b, and/or 105c in any suitable way and the user need not be aware of how this data is distributed or that it is distributed.

For example, parallel server 101 may row-distribute the data, such that each processor stores one row of Matrix A. That is, processor 105a may store element (0,0) and element (0,1), processor 105b may store element (1,0) and element (1,1) and processor 105c may store element (2,0) and element (2,1). Alternatively, the parallel server may column-distribute the data so that each column of Matrix A is stored on one of the processors 105 of parallel server 101. For example, element (0,0), element (1,0), and element (2,0) may be stored on processor 105a, while element (0,1), element (1,1), and element (2,1) may be stored on processor 105b. Any other suitable distribution of data may be used, as the invention is not limited in this respect.

It should be appreciated that when data is referred to herein as being stored on a particular processor or a particular processor is referred to as storing data, this does not require that the data be physically stored on the processor. Rather, data being stored on a processor or a processor storing data means that the data is stored in memory that is allocated to or under control of the processor. Likewise, when data is referred to herein as being distributed amongst processors, it is not required that the data be physically stored on the processors, but rather means that the data is stored in one or more memories and each processor is allocated or controls memory that stores at least a portion of the data.

From the user's global view perspective, the manner in which Matrix A is distributed amongst the processors 105 is irrelevant. Client 103 may subsequently create a second matrix, Matrix B, on the parallel server. Matrix B may, for example, also be a 3×2 matrix of integer values and may also be distributed amongst processors 105 in any suitable way. Matrix A and Matrix B need not be distributed amongst the processors in the same way. For example, the parallel server may row-distribute Matrix A, but may column-distribute Matrix B. However, like Matrix A, the manner in which Matrix B is distributed amongst the processors 105 is irrelevant when taking a global view of the data.

Client 103 may next send a command to parallel server 101 to add Matrix A and Matrix B and store the result in a third matrix, Matrix C. Because the user is unaware of how Matrix A and Matrix B are distributed amongst processors 105, the user is unable to instruct each processor on what action to take to add Matrix A and Matrix B. However, parallel server 101 is aware of how these matrices are distributed. Thus, when parallel server 101 receives the command to add Matrix A and Matrix B, each processor 105 may be instructed to take the appropriate actions to add the two matrices. For example, if both Matrix A and Matrix B are row distributed, processor 105a may be instructed to add the content of cells Matrix A(0,0) and Matrix B(0,0) (hereinafter, simply referred to as adding the referenced cells) and to add Matrix A(0,1) and Matrix B(0,1). Likewise, processor 105b may be instructed to add Matrix A(1,0) and Matrix B(1,0) and to add Matrix A(1,1) and Matrix B(1,1). Similarly, processor 105c may be instructed to add Matrix A(2,0) and Matrix B(2,0) and to add Matrix A(2,1) and Matrix B(2,1). The result of the addition of Matrix A and Matrix B is a 3×2 row-distributed matrix (i.e., Matrix C). Parallel server 101 may return a pointer or handle that the client may use to refer to Matrix C. Client 103, using the pointer or handle returned from parallel server 101, may subsequently request that parallel server return Matrix C to the client. In response, parallel server 103 may instruct each processor 105 to return the portion of Matrix C that it stores. Thus, for example, processor 105a may return Matrix C(0,0) and Matrix C(0,1), processor 105b may return Matrix C(1,0) and Matrix C(1,1), and processor 105c may return Matrix C(2,0) and Matrix C(2,1).

In addition to taking a global view of data, the user may, in some situations take a "local" view of the data. When treating data from a local perspective, a user may be aware of how an object is split amongst processors and may instruct specific processors to perform operations on the portions of the distributed object that they store. Thus, for example, if a user has previously-written serial code that operates on a certain type of data, the user may instruct each processor to execute that code on the portion of the distributed data it stores.

As used herein, a splitting of an object or data structure, such as, for example, a matrix, amongst processors may be an "abstract splitting" or a "physical distribution." In a physical distribution, data is physically distributed among the processors in the manner specified in the splitting. For example, if a matrix is physically row-distributed, then each row of the matrix is stored on a different processor. In an abstract splitting, data is split among abstract processors and the abstract splitting may have little or nothing to do with the way in which data is physically distributed among the physical processors. The term "abstract processor" as used herein, refers to a non-physical virtual processor whose operations may be performed by one or more physical processors. For example, a 2×4 matrix may be physically row-distributed on a parallel server that has two processors, such that one row of the matrix is physically stored on each processor. However, the same matrix may be abstractly split amongst four abstract processors, such that each column of the matrix is abstractly stored on one of the four abstract processors. Thus, for the purposes of performing operations on the matrix, the matrix is treated by the parallel server and the user as if it were column-split among four processors, though the actual physical distribution of the data is a row-distribution among two physical processors.

An example of a series of local view operations is provided in FIG. 1B. In FIG. 1B, client 103 creates a Matrix A on parallel server 101. As in the example of FIG. 1A, Matrix A may be a 3×2 matrix of integers. The user may have previously written a serial routine called, for example, 'avg' that takes as input a 1×2 matrix of integers, computes the average of the two integers in the matrix, and outputs the average as a 1×1 matrix. Thus, Client 103 may subsequently send a command to parallel server 101 to row-split Matrix A across processors 105a, 105b, and 105c so that each processor has 1×2 matrix that is one row of Matrix A. It should be appreciated that, in some embodiments, processors 105a, 105b, and 105c may be abstract processors and the row-splitting may be an abstract splitting. That is, the data of Matrix A may be physically stored on the physical processors of parallel server 101 in a manner different from the row-splitting described above. Alternatively, in other embodiments, the row-splitting of Matrix A may be a physical distribution. That is, processors 105a, 105b, and 105c may be physical processors and one row of Matrix A may be physically stored on each of these processors.

Client 103 may instruct the parallel server to have each processor 105 execute the previously-written 'avg' routine, using the 1×2 matrix stored on the processor as input. The results of this operation is that there is a 1×1 matrix stored on each of processors 105, wherein the value in each of the 1×1 matrices is the average of the numbers in one of the rows of Matrix A. In embodiments in which Matrix A is abstractly row-split, it should be appreciated that is the abstract processors that each execute the 'avg' routine. At the physical level, depending on how the data is physically distributed among the processors, some or all of the physical processors may execute the 'avg' routine or some physical processors may execute the 'avg' routine multiple times using different portions of the matrix physically stored thereon as input. In some embodiments, the 'avg' routine is not executed at all, but rather the parallel server causes the physical processes to perform operations that would have the same result as executing the 'avg' routine on each processor that stores a row of the row-split matrix.

One embodiment of the invention is directed to providing a utility which allows a user to write a program to be executed on the parallel server that uses both a global view of data and local view of data. That is, a portion of the program may operate on the data globally, while another portion of same program operates on the data locally.

U.S. patent application Ser. No. 11/217,114, titled "METHODS AND APPARATUS FOR PARALLEL EXECUTION OF A PROCESS," filed on Aug. 31, 2005 (hereinafter, "the '114 application"), which is hereby incorporated by reference in its entirety, describes a system in which a user may write parallel programs using a global view of the data. Specifically, the application describes a system that employs a scientific computing software application to write programs which are then "parallelized" by software on the parallel server. As used herein, the term scientific computing software application refers to a software application capable of solving computational problems that are input by a user. Examples of commercially available scientific computing software applications include MATLAB™, produced and sold by The MathWorks, Natick, Massachusetts, Maple™, produced and sold by Maplesoft, Waterloo, Ontario, Canada, Mathematica™, produced and sold by Wolfram Research, Champaign, Ill., Octave, produced and distributed by GNU, and Excel™, produced and sold by Microsoft Corporation, Redmond, Wash.

The system of the '114 application that allows a user to operate globally on distributed data is described below and may employ a technique referred to as overloading. As used herein, the term overloading refers to having two or more objects or methods that have the same name but have different meanings or functionalities depending on the context in which the object or method is used. For example, which method is called may depend on the number of parameters with which the method is called or the data type of parameters with which the method is called. That is, a programmer may define two methods each named Area. The first Area method may take as a parameter a user-defined data type called Triangle and computes the area of a triangle. The second Area method may take as a parameter a user-defined data type called Circle and computes the area of a circle. Thus, simply from the line of code "B=Area(A)," it cannot be determined which Area method is to be called. That is, if the variable A is of the data type Triangle, the first Area method is called, while if the variable A is of the data type Circle, the second Area method is called.

As another example, from the programmer's perspective, the method call for the two or more methods that share the same name may be identical. That is, the method name, the number of parameters and the type of parameters are the same for both (or all) of the methods and the decision as to which of the two or methods is called is not made by the programmer at the time of programming. For example, the line of code x+y, where both x and y are variables that represent matrices of integers may have different functionality depending on the context in which the line of code is written. Thus, for example, if both x and y are small matrices, an addition routine that performs a normal matrix addition may be called. However, if either x or y represents a matrix larger than a certain size an addition routine that performs the matrix addition in parallel may be called. The decision as to which addition routine is to be called may be made in any suitable way as the invention is not limited in this respect. For example, the decision may be made either at compile time, at run time, or at any other suitable time. Further, the decision may be made by any suitable entity, such as the compiler or interpreter of the programming language, or an outside software program (though the compiler, interpreter, or outside software program may be manually configured, e.g., by a programmer, to make these decisions in a certain way).

As in the example above, operators may also be overloaded. For example, the function of the '+' operator in the line of code 'C=A+B' may be different depending on the data types of the operands A and B. That is, if the operands A and B are integers, the '+' operator may be defined to perform a integer addition. However, if the operands A and B are arrays or matrices, the '+' operator may be defined, by the programmer, to perform a matrix addition.

FIG. 2 is an example of a system in which polymorphism (e.g., by overloading methods and/or operators) may be used to provide parallel computing capability to a scientific computing software application. The system of FIG. 2 includes a scientific computing software application 201, communication software 203, and server software 205.

In one embodiment, operators and/or methods of a program of scientific computing software application 201 may be overloaded. The overloaded methods and/or operators may be defined to pass a message to communication software 203 requesting that a certain operation or process be performed in parallel. Communication software 203, in response to receiving the message, may then send a command to server software 205 to perform the process in parallel. This may be done in any suitable way, as the invention is not limited in this respect. For example, a new data type or class may be defined and operators and/or methods may be overloaded such that when the operators and/or methods are called with a parameter or operand of the newly defined data type, the overloaded method is called.

As an example, the rand function in the programming language of a scientific computing software application may be a built-in method of scientific computing software application 201 that creates an n-by-n matrix of randomly-valued entries, where n is an integer value specified in the parameter of the method. Thus, the line of code in Table 1 creates a 100-by-100 matrix of random numbers and stores the result in the variable 'X.' The server software may then pass out tasks to a plurality of processors, to complete the task or tasks require by the method.

TABLE 1

X = rand(100);

However, the rand method may be overloaded so that if the parameter provided is of the new data type (i.e., as opposed to an integer or scalar), then the overloaded rand method is called rather than the built-in rand method. For example, in the line of code in Table 2, the parameter provided to the rand method is "100*p." The variable p may be an object of the new data type or class which, for the purposes of this example is called the dlayout class. The * operator may be the built-in multiplication operator of scientific computing software application 201, which takes two operands. However, the * operator may be overloaded, such that when one or both of its operands are objects of the dlayout class, the overloaded operator is called. The overloaded * operator may return an object of the dlayout class.

TABLE 2

X = rand(100*p);

Thus, the operation "100*p" in Table 2 may return a dlayout object. The rand method may also be overloaded so that when the parameter provided is a dlayout object (instead of an integer or scalar), the overloaded rand method is called. The overloaded rand method may call communication software 203 which sends a command to server software 205 to create a distributed 100-by-100 matrix. The overloaded rand method may return an object of a user-defined data type or class that may be used as a name or handle to reference the matrix created on the parallel server. For example, the overloaded rand method may return an object of the user-defined ddense class, which is stored in the variable X. Thus, the distributed matrix on the parallel server may be accessed and manipulated using the variable X. For example, as shown in Table 3, a method for computing the eigenvalues of a matrix may be performed on the distributed matrix.

That is, the built-in method eig of scientific computing software application 201 may take a matrix or an array as its parameter. However, the eig function may be overloaded so that if the parameter provided to the method is an object of the ddense class, the overloaded method is called. Like the overloaded rand method, the overloaded eig method, when called, may call communication software 203 which may send a command to server software 205 to calculate the eigenvalues of the distributed matrix X. The overloaded eig method may also return an object of the ddense class, which is stored in the variable Y, and may be used as a handle to access the matrix of eigenvalues on the parallel server.

TABLE 3

Y = eig(X)

Because the overloaded methods and/or operators used to contact the parallel server as well as the parallel algorithms that execute on the parallel server may be provided for the user of the scientific computing software application (i.e., without the user having to code them), the user need not have detailed knowledge of parallel programming. Rather, much of the parallel processing capability is transparent to the user.

For example, continuing with the examples provided above, from the user's perspective, the only difference in the program code needed to create a 100-by-100 matrix of random numbers and compute its eigenvalues is the addition of the tag "* p" in the parameter of the rand method, as shown above in Table 2. However, the "*p" tag causes a distributed matrix to be created on the parallel server and future operations on the matrix to be performed in parallel, without the user having to devise or code an parallel algorithms. In the examples above, the rand and eig methods and the * operator were overloaded to perform certain operations in parallel, such as creating a distributed matrix on a parallel server and computing its eigenvalues in parallel. However, the invention is not limited in this respect, as any suitable built-in method or operator of the scientific computing software application may be overloaded (e.g., to cause its functionality to be performed in parallel).

In the examples described above in connection with Tables 2 and 3, the user is taking a global view of the data. That is, the objects X and Y are global objects and the user need not be aware of how these objects are distributed amongst the processors of the parallel server. Thus, when the user instructs the parallel server to computer the eigenvalues of the matrix referenced by the variable X, the user need not specify what specific operation each processor of the parallel server needs to take to computer these eigenvalues. Rather, server software 205 is aware of the manner in which the data is distributed and has a routine for computing, in parallel, the eigenvalues of a matrix that is distributed in this manner.

It should be appreciated that, although in the examples above certain data types, classes, methods, and/or operators are described as being user-defined, these data-types, classes, methods, and/or operators need not be defined by the ultimate end user of the scientific computing software application. Indeed, the term user-defined is merely used to distinguish between those classes, methods, and operators that are built-in to the scientific computing software application programming language by its publisher's specification and those that are added in by an external programmer. Thus, in one embodiment, the overloaded methods, operators, and user-defined classes may be provided in a software package that also includes communication software 203 and server software 205. The software package, when installed, may work in conjunction with scientific computing software application 201 to provide the above-described parallel processing functionality.

Further, in the examples above, the built-in methods and operators were only overloaded with a single additional method or operator. However, the invention is not limited in this respect, as a method or operator may be overloaded with any suitable number of methods or operators. That is, in the example provided above, the * operator was overloaded with a * operator that takes an object of the dlayout class as one of its operands and returns a dlayout object. However, the * operator could also be overloaded with an operator that takes two ddense objects (each of which references a distributed matrix on the parallel server) as its operands, causes a matrix multiplication of the two distributed matrices to be performed in parallel, and returns a ddense object that serves as reference to the distributed matrix that results from the matrix multiplication. Thus, in the example above, the * operator may perform one of three different operations, depending on the data types of its operands.

Additionally, in the examples above, two data types or classes were defined (i.e., dlayout and ddense). It should be appreciated that these class names are provided as examples and any suitable class names or data type names may be used. Moreover, while in the examples above two user-defined data types or classes were used in connection with providing parallel computing capability in scientific computing software application 201, the invention is not limited in this respect, as any suitable number of user-defined data types or classes may be used. Further, any suitable data and methods may be encapsulated in these user defined data types, as the invention is not limited in this respect.

In one embodiment, scientific computing software application 201 and communication software 203 may execute on the processor of a client computer, while server software 205 may execute on multiple processors of one or more parallel servers. However, the invention is not limited in this respect, as scientific software application 201 and communication software 203 may execute on any suitable processor or processors. For example, scientific software application 201 may execute on one of the processors of the parallel server that executes server software 205. In such embodiments, the processor that executes scientific software application 201 and/or communication software 203 may be viewed as the client, while the remaining processors in parallel server 205 (individually and in collections of one or more of them) may be viewed as the parallel server. It should be appreciated that the processor that executes scientific software application 201 and/or communication software 203 may also execute a portion of server software 205. Thus, this processor may be viewed as the client as well as part of the parallel server.

The parallel server that executes server software 205 may be any suitable type of parallel server, as the invention is not limited in this respect. For example, the parallel server may be a symmetric multiprocessing (SMP) system, a massively parallel processor (MPP) system, or may be a Beowulf cluster. In this respect, it should be appreciated that parallel server may include a plurality of separate machines that are linked together so that they may operate on a single problem in parallel. A system having such an architecture may be viewed as a single parallel server, despite being made up of many individual computers that are also capable of operating independently of each other.

In the examples above, overloaded methods and operators are used in scientific computing software application 201 to call and/or pass messages to communication software 203 (which, in turn, sends a command to parallel server 205). These software entities may communicate in any suitable way, as the invention is not limited in this respect. For example, in one embodiment, subroutines of communication software 203 may be linked (either statically or dynamically) into scientific computing software application 201, so that the overloaded methods and/or operators of scientific computing software application may directly call these subroutines. In another embodiment, interprocess communication may be used to communicate between scientific computing software application 201 and communication software 203. Any suitable form of interprocess communication may be used, such as, for example, pipes, signals, message queues, semaphores, shared memory, sockets, or any other suitable form, as the invention is not limited in this respect.

Because scientific computing software applications are intended primarily for computing and modeling, the programming languages of these software applications typically do not provide the capability to perform and/or handle communications over a network. Thus, in one embodiment, communication software 203 may be written in a language (e.g., C or Fortran) that provides network communication capability. However, in embodiments of the invention in which the programming language of scientific computing software application 201 allows a programmer to perform network communications, communication software 203 need not be used, and the overloaded methods and operators of scientific computing software application 201 may programmed to send commands to server software 205 (i.e., without using communication software 203 as an intermediary).

In embodiments wherein scientific computing software application 201 and communication software 203 reside on a separate machine from server software 205, communication software 203 or (in embodiments where communication software 203 is not used) scientific computing software application 201 may communicate with server software 205 over a network. Any suitable network protocol or protocols may be used, as the invention is not limited in this respect. For example, in some embodiments, the TCP/IP protocol may be used. In embodiments wherein scientific computing software application 201 and communication software reside on a processor of the parallel server that executes server software 205, any suitable method of communication between communication software 203 (or, in some embodiments, scientific computing software application 201) and parallel server 205 may be used. For example, network based communication may be used, even though the communications are not necessarily traveling over a network; interprocess communication may be used; or any other suitable form of communication may be used, as the invention is not limited in this respect.

Solving problems in parallel often involves operating on very large data sets. Consequently, passing results between the client and the parallel server each time they are computed may decrease performance. Thus, in one embodiment, data may remain on the parallel server, unless results are explicitly requested to be sent to the client. For example, as discussed in above, the example line of code in Table 2 causes a command to be sent to the parallel server to create a 100-by-100 matrix distributed matrix of random numbers. The parallel server may create the 100-by-100 matrix in response to the command. If the result of this computation (i.e., the 100-by-100 matrix) were to be sent back to the client rather than keeping the data on the parallel server, 10,000 numbers may have to be sent back to the client. Further, future operations on the matrix to be performed by the parallel server may involve sending the matrix data back to the parallel server from the client so that the parallel server may operate on the data. This sequence may increase network traffic, latency, and overall processing time.

However, if the data remains on the parallel server, the data need not be transferred unless the user of the scientific computing software application explicitly requests to view the data. For example, the 100-by-100 matrix created on the parallel server using the line of code in Table 4 may remain on the parallel server and only a reference to that data may be returned to the scientific computing software application. In the example, in Table 4, this reference is stored in the ddense variable 'X.' Thus, if it is desired to perform future operations on the matrix, the matrix data can be identified and located on the parallel server using this reference.

If a user of a scientific software computing application desires to view a portion of the resulting data, the user may request that this data be returned from the parallel server and displayed. This may be done in any suitable way, as the invention is not limited in this respect. In some embodiments, method and/or operator overloading may be used to request that data stored on the parallel server be returned to the client. For example, the line of code shown in Table 4 may be used to retrieve and display the first element of the distributed matrix created by the line of code in Table 2. Scientific computing software application 201 may provide, for example, a method called subsref that is used to access an array or matrix element and invoked by the notation A(R,C), where A is a variable that represents the array or matrix and R,C refers to the row and column of the requested matrix element. The subsref function may be overloaded so that if called with a ddense variable as its parameter instead of an array or matrix, a command may be sent to the parallel server to return the requested element of the matrix that is referenced by the ddense variable.

TABLE 4

X(1,1)

Figure 3:
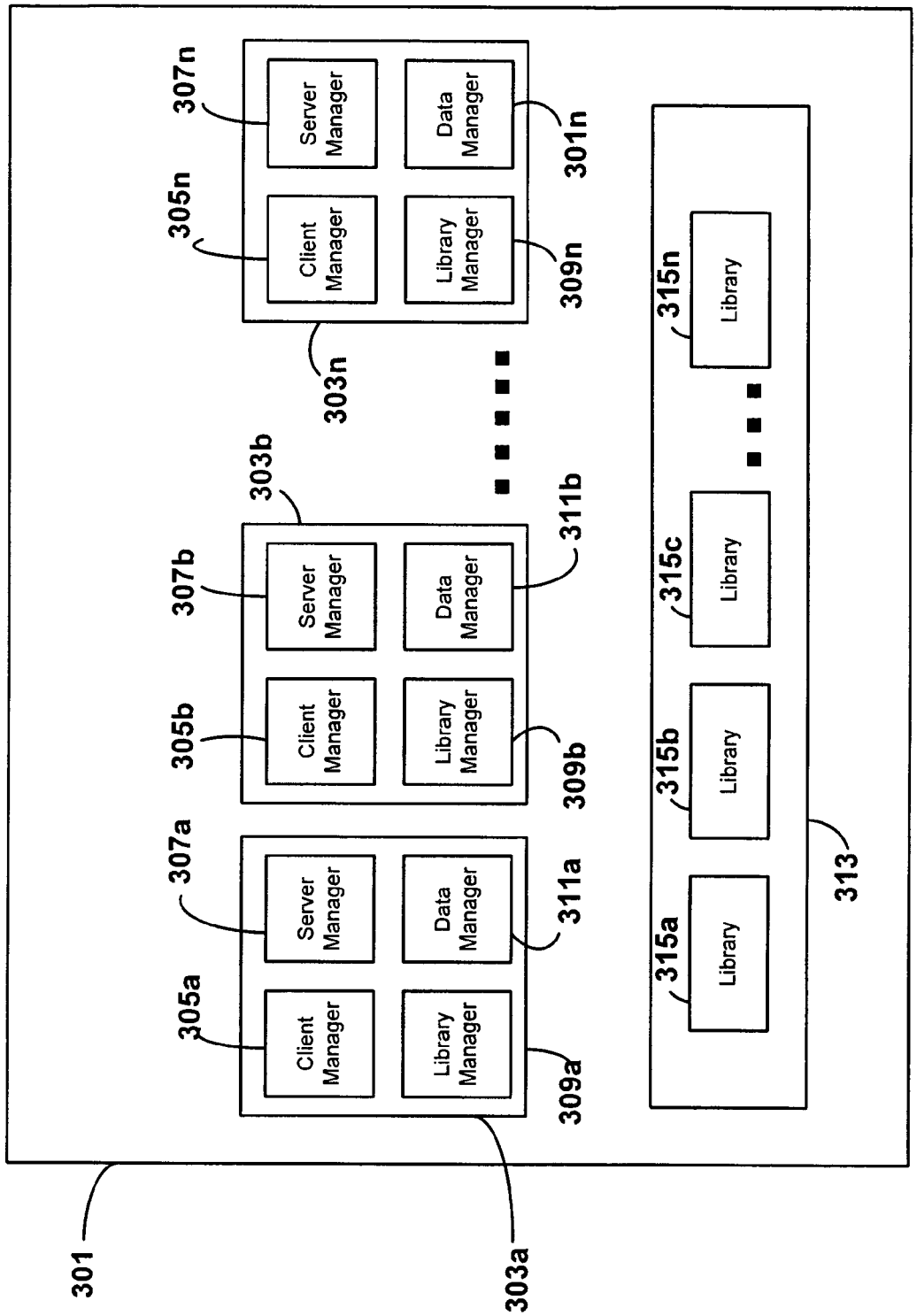
FIG. 3 is a block diagram of an example of parallel server that executes the server software of FIG. 2, in accordance with the methods and systems as taught herein.

Server software 205 may operate in any suitable way to receive commands from the client and perform operations in parallel, as the invention is not limited in this respect. FIG. 3 is but one example of a suitable configuration of server software 205 for at least some embodiments. In FIG. 3, parallel server 301 includes a plurality of processors, 303a, 303b, ..., 303n, and a memory 313. Each of processors 303a-303n includes four software modules: client managers 305a, 305b, ..., 305n; server managers 307a, 307b, ..., 307n; library managers 309a, 309b, ..., 309n; and data managers 311a, 311b, ..., 311n. Memory 313 of parallel server 301 stores a plurality of software libraries 315a, 315b, 315c, ..., 315n that include routines for performing various operations.

Client managers 305 interface with clients, and provides routines for reading commands and arguments from a client and sending results and other data back to the client. Server managers 307 handle communications between server processes executing on different processors of parallel server 301. That is, server managers 307 manage the transmission of data between the processors of parallel server 301 and collect results and error codes from the processors. Library managers 309 are responsible for maintaining a list of available software libraries 315 and the routines provided by them. When instructed by a server manager 307, library manager may perform a call to a routine of one of the libraries 315. Data managers 311 include routines for creating, deleting, and changing, data stored on the parallel server. Data managers 311 maintain a mapping between the references and/or identifiers used by the client to identify the data and the actual storage location of the data.

In one embodiment, when server software 205 is initialized, one processor may be designated the head processor and all or some of the remaining processors may be designated slave processors that operate under the control of the head processor. The head processor may serve as the central processor and may receive the commands from the client. Thus, in one embodiment, only the client manager module 305 on the head processor is used. When the head processor receives a command from the client, the server manager 307 on the head processor may send messages to the "slave" processors to perform the desired operation. The library managers 309 on each of the processors may call the appropriate routine in libraries 315.

The server managers 307 on the processors 303 may communicate with each other in any suitable way, as the invention is not limited in this respect. In one embodiment, the message passage interface (MPI) application programming interface (API) may be used. Alternatively, the parallel virtual machine (PVM) API or any other suitable from of communication may be used.

In the example of FIG. 2, parallel server 301 is shown having a memory 313 which stores software libraries 315. Memory 313 may be assembled from any suitable type of memory or memories and may include, for example, non-volatile storage media, such as magnetic disk, optical disc, or tape, and/or volatile memory, such as random access memory (RAM). Further, in FIG. 2, parallel server 301 is shown having a single memory that is shared by all processors. However, the invention is not limited in this respect, as each processor may have a separate memory or clusters of processors may share memory. For example, in embodiments in which parallel server 301 is implemented as a Beowulf cluster, each processor may have a separate memory and a separate copy of libraries 315 (or parts thereof). Further, in some embodiments in which processors 303 share a memory, portions of the memory may be allocated to each processor for exclusive use by that processor. Thus, each processor may maintain a separate copy of libraries 315 in the portion of the memory allocated to it.

In the example of FIG. 3 parallel server 301 includes processors 303a-303n. It should be appreciated that the parallel server may have any suitable number of processors and the invention is not limited in this respect. Similarly, memory 313 may store any suitable number of software libraries. Examples of software libraries that may be used are ScaLA-PACK and the Parallel Basic Linear Algebra Subprograms (PBLAS) library, both of which include parallel linear algebra routines.

In the example of FIG. 3, server software 205 is implemented, in part, as four software modules on each processor. It should be appreciated that the invention is not limited in this respect, as server software 205 may be implemented in any suitable way. Further, it should be understood that the four modules in the above-described examples are intended to illustrate functionally how server software 205 may operate. However, the four modules need not be implemented as separate computer programs and may be implemented in any suitable way, as the invention is not limited in this respect.

In one embodiment, the system of FIG. 2 may, in addition to enabling the programmer to perform parallel operations using global addressing of a distributed data (i.e., referring to and operating on the distributed data as a single object), enable the programmer to perform parallel operations using local addressing of the same distributed object (i.e., referring to and operating on portions of the distributed data on a processor-by-processor basis). That is, to multiply a Matrix A and a Matrix B that are both split amongst processors on a parallel server, a programmer may refer to the matrices globally with the line of code C=A*B. Alternatively, the programmer may take a local view of the two matrices by instructing the parallel server to distribute the matrices amongst the processors in a particular manner, and operating on each portion of the distributed matrices separately.

An example of operating on distributed data in both a global mode and a local mode is shown in Table 5. As in the examples above, the line of code "A=rand(3*p)" creates a distributed 3×3 matrix of random numbers on the parallel server. Similarly, the line of code "B=rand(3*p)" also creates a distributed 3×3 matrix of random numbers on the parallel server. The line of code "C=A+B" is global operation that adds the matrix referenced by the variable A and the matrix referenced by the variable B. The operation is a global operation because the user does not instruct each processor which stores a portion of the two matrices what operation to perform. Rather, the user treats the two matrices as non-distributed matrices and simply instructs the parallel server to add them. The intelligence of what operation(s) each processor needs to perform in order to add the two matrices resides in the parallel server and the user need not be aware of how this is done.

However, in the subsequent line of code that reads "D=ppeval('avg', split(C,2))" the user operates on the data locally on each processor. The function ppeval may be a function that takes two arguments. The first argument may be the name of a function to be executed on each processor and the second argument is the data to be input into the function and a specification of how that data should be split amongst the processors.

In the example of Table 5, the name of the function to be executed on each processor is 'avg.' This may be a previously-written routine that takes as input a 3×1 matrix, computes the average of the numbers in the matrix and returns a scalar that is the average of the numbers. This routine may be executed on each of the processors of the parallel server that stores a portion of the input data. The routine may be provided to each of these processors in any suitable way. In some embodiments, the routine may be stored on the client. In such embodiments, the routine may be provided from the client to the parallel server in a manner that is transparent to the user.

For example, the routine may be stored as a file in a file system on the client. The ppeval function may access the file that includes the program code for the routine on the client and send it to the parallel server for execution on each processor. In some embodiments, the parallel server may cache the routine thereon for future use. Thus, for example, if the same routine is used again in the computer program (e.g., in a subsequent invocation of the ppeval function) or in a different computer program, the ppeval function may determine if the routine has changed since the last time it was provided to the parallel server. If the routine has not changed, then the parallel server may use the cached version, without the client having to provide the routine to the parallel server again. If the routine has changed since the last time it was provided to the parallel server, then the new version of the routine may be provided to the parallel server. The determination as to whether a routine has changed since it was last provided to the parallel server may be made in any suitable way, as the invention is not limited in this respect. For example, in embodiments in which the routine is stored as a file in a file system, the file system timestamp for the file may be used in determining when the routine was last modified.

In some embodiments, the file that includes the program code for the routine may be stored in memory on the parallel server, in addition to or instead of on the client. In such embodiments, a copy of the file may be stored on each processor or a single copy of the file may be stored in a memory location accessible to all processors. This allows a user to execute previously-written serial routines that the user desires to re-use in the context of parallel program.

In the examples above, the ppeval function is a function that accepts two arguments (i.e., the name of a routine to be executed and the input data to the routine). However, the invention is not limited in this respect, as the function used to execute a routine in local mode may take any suitable form, may have any suitable name, and may take any suitable number of examples. For example, the ppeval function may take any number of arguments, where the first argument is the name of a serial routine that takes multiple arguments and the subsequent arguments are the multiple inputs to the routine. It should further be appreciated that the arguments may be presented in any suitable order, as the invention is not limited to providing the arguments in the illustrative order shown in the examples above.

Figure 4:
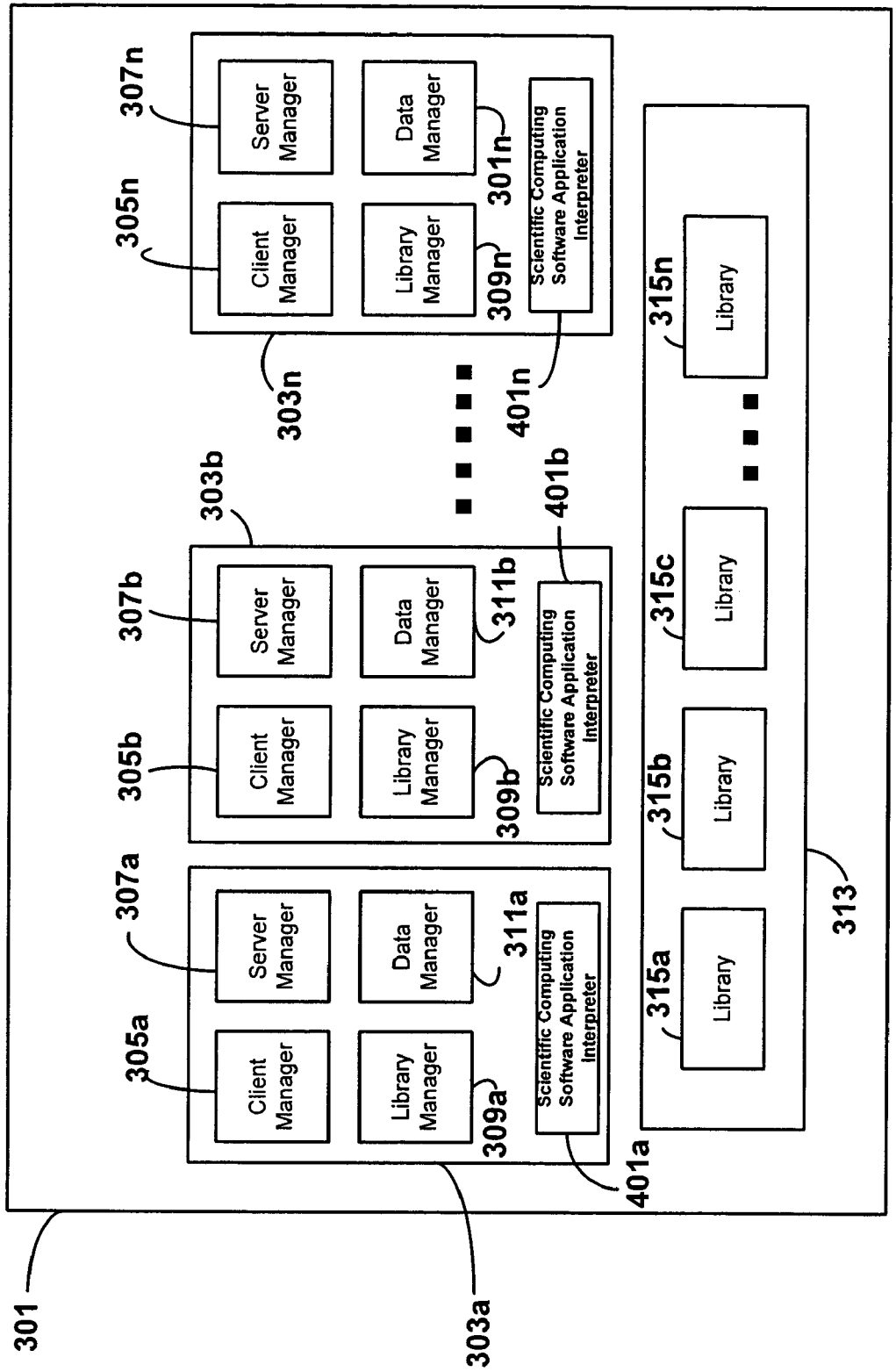
FIG. 4 is a block diagram of an example of parallel server that executes the server software of FIG. 2, in accordance with the methods and systems as taught herein.

FIG. 4 is one example of a suitable configuration of server software 205 that may be used in a system which enables both global and local operations. The server software is similar to the server software shown in FIG. 3, but each processor 303 also includes a scientific computing software application interpreter 401. That is, processor 303a includes scientific computing software application interpreter 401a, processor 303b includes scientific computing software application interpreter 401b, and processor 303n includes scientific computing software application interpreter 401n. Scientific computing software application interpreters 401 are provided on each processor to allow each processor to locally execute routines provided by the ppeval function. For example, the 'avg' routine that is the first argument in the ppeval function may be a routine written in the language of scientific computing software application 201. When this routine is provided to each processor 303, scientific computing software application interpreter 401 may interpret the routine allowing it to be executed on each processor.

In the example above, the 'avg' routine is a routine written in the language of the scientific computing software application 202. Thus, for example, the computer program excerpt shown in Table 5 may be written in the language of scientific computing software application 202 and interpreted by an instance of the scientific computing software application interpreter executing on the client. Further, the 'avg' routine may be written in the same programming language and interpreted by instances of scientific computing software application interpreter executing on each of the processors of the parallel server. However, the invention is not limited in this respect, as the client program and the routine to be executed on a particular processor of the parallel server may be written in different programming languages. For example, the client program (e.g., the program of Table 5) may be written in the language of the scientific computing software application, and the routine specified in the client program that is to be executed on a particular processor or processors of the parallel server (e.g., the 'avg' routine) may be written in a different program language. For example, this routine may be written in Perl and each processor of the parallel server may execute a Perl interpreter. Indeed, any suitable programming language may be used and each processor of the parallel server may have an interpreter for processing that particular programming language.

In some embodiments, the programming language in which the client program and/or the routine to be executed on each processor of the parallel server (e.g., the 'avg' routine) are written is not an interpreted language, but rather is a compiled language. As used herein, an interpreted language refers to a programming language in which the processor instructions (e.g., the machine level instructions) of a program written in the language are generated from the program at run time. A compiled language refers to a programming language in which the processor instructions of a program written in the language are generated from the program prior to run time. In some embodiments in which the routine to be executed on the processors of the parallel server is written in a compiled language, each processor may be provided with a compiler for that application so that it may receive the routine and compile it, so that the routine may be executed on the processor. In other embodiment, the routine may be compiled and assembled before being provided to the processors of the parallel server, such that the object code of the routine is provide to the processors. Thus, the processors need not compile or interpret the routine, but may simply execute the object code. Further, in such embodiments, the processors need not be provided with a compiler or an interpreter to compile or interpret the routine.

TABLE 5

A = rand(3*p);
B = rand(3*p);
C = A + B;
D = ppeval('avg', split(C,2));
D.a = D.a + 1;
D.b = D.b + 1;
D.c = D.c + 1;
E = ppjoin(D, 3, 1);
E(0,0)

The second argument in the ppeval function specifies the input data for the function specified in the first argument and how the input data should be split amongst the processors. In the example of Table 5, the second argument to the ppeval function is "split(C,2)." This argument indicates that the input data to the 'avg' routine is the matrix referenced by the variable C. The function split is a function that causes the data of the matrix C to be split amongst the processors of the parallel server. As discussed above, this split may be an abstract splitting or a physical distribution. The first argument of the split functions specifies the data to be distributed (as well as the data to be input into the 'avg' function) and the second argument specifies the manner in which the data is to be distributed. In the example of Table 5, the data to be distributed is, as mentioned above, the matrix referenced by the variable C. The second argument to the split function is "2". This indicates that the data is to be distributed along the second dimension of the n-dimensional matrix. Because the matrix referenced by the variable C is a two-dimensional matrix, the second dimension of the matrix is its width (i.e., the number of columns). Thus, the "2" indicates that the data of the matrix is to be column-split. In the example above, the matrix referenced by the variable C is 3×3 matrix, thus the data of the matrix will be split amongst three processors with each processor storing one column of the matrix. If the arguments provided to the split function were split(C,1) rather than split(C,2), than the matrix would be split along the first dimension of the matrix (i.e., its height). Thus, split(C,1) would result in the matrix being row-split amongst three processors, which each processor storing one column of the matrix.

In the examples discussed above in connection with Table 5, two possible splittings of the matrix are discussed (i.e., row-distribution and column-distribution) and syntax is provided for distributing a matrix along its nth dimension. It should be appreciated that the invention is not limited in this respect as the user may specify any suitable splitting to the parallel server using any suitable syntax. For example, the matrix could be split along its diagonal, could be split into m×n blocks that are each stored on one of processors, or could be split in any other suitable way. In one embodiment, rather than splitting the matrix and distributing it, the entire matrix may be provided to each processor. For example, as shown in the example of Table 6, rather than distribute the matrix referenced by object C amongst the processors of the parallel server, the matrix may be broadcast to each processor, such that each processor stores its own copy of the entire matrix. Thus, rather than specifying split(C,2) in the argument specifying the object to be distributed, bcast(C) is provided, indicating that the matrix referenced by the object C should be provided to each processor.

TABLE 6

D = ppeval('avg', bcast(C));

In some embodiments, a splitting may cause an overlap of data among processors. For example, a three-day-moving-average split may be used, wherein a 1×7 matrix is split such that a first processor stores elements 1, 2, and 3 of the matrix, a second processor stores elements 2, 3, and 4, a third processor stores elements 3, 4, and 5, a fourth processor stores elements 4, 5, and 6, and a fifth processor stores elements 5, 6, and 7.

Figure 7A:
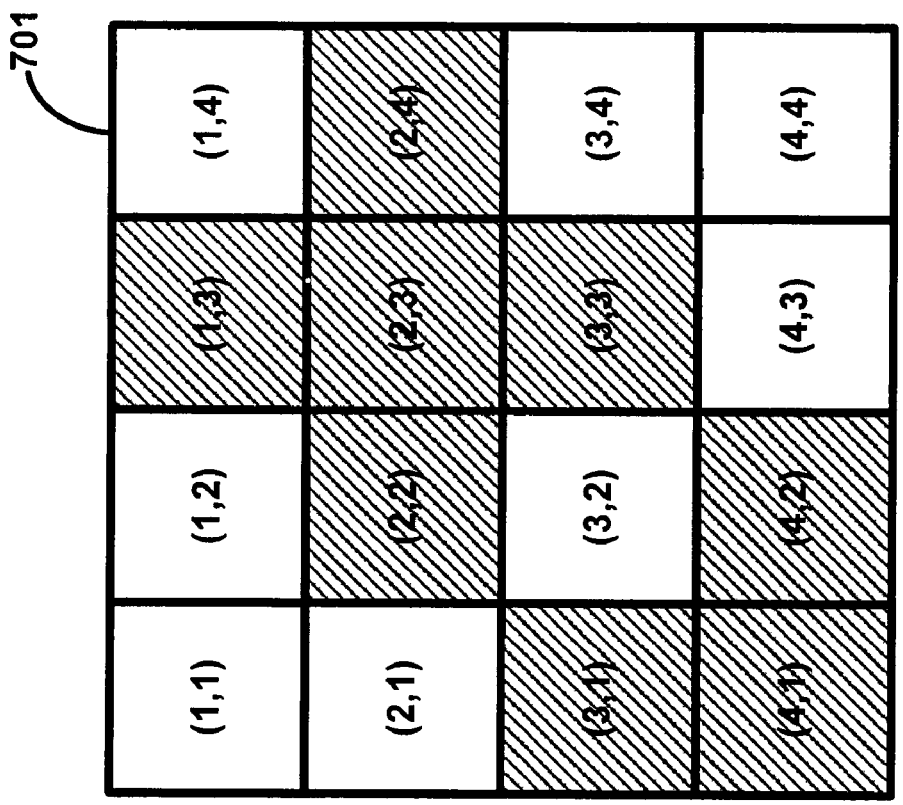
FIG. 7A is a diagram of a stencil-splitting of a matrix in accordance with the methods and systems taught herein.

Another example of a suitable splitting is a stencil splitting, whereby each element (i,j) in a matrix and its north, south, east, and west neighbors is stored on a different processors. For example, as shown in FIG. 7A, element (2,3) of matrix 701 may be provided to a processor with its north, south, east, and west neighbors: element (1,3); element (2,2); element (2,4); and element (3,3). This may be done for each element (i,j) in the matrix. For elements along an edge of the matrix, such as element (4,1), the neighbors may wrap around or may be cut off and treated as zero. For example, the north neighbor of element (4,1) is element (3,1) and the west neighbor is element (4,2). In embodiments which employ a wrap-around, its east neighbor may be treated as element (4,4) and its south neighbor may be treated as element (1,1). In embodiments which employ a cut-off, its east and south neighbors may be treated as elements with a value of zero.

Figure 7B:
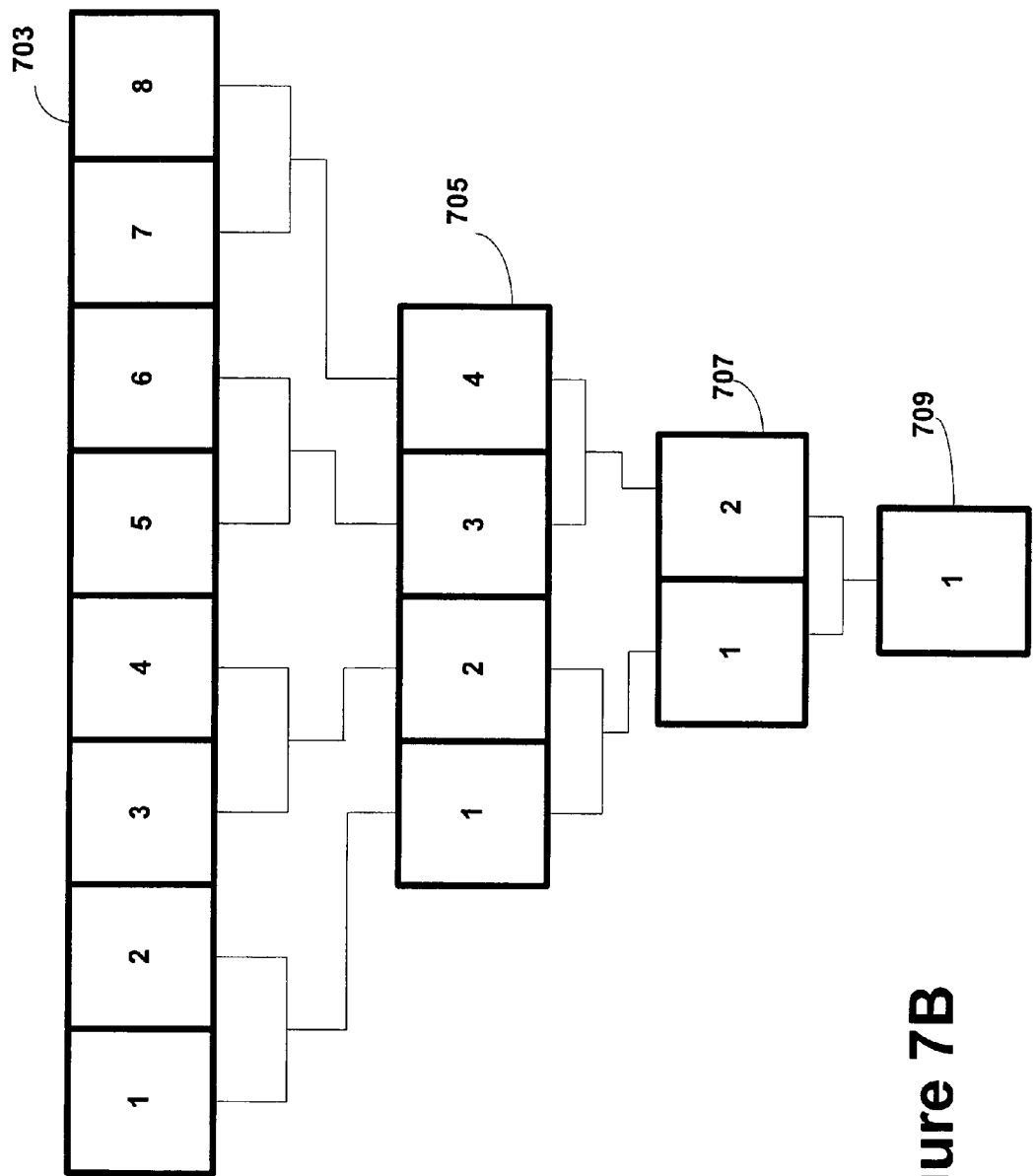
FIG. 7B is a diagram of a multi-grid splitting of a matrix in accordance with the methods and systems taught herein.

Another example of a suitable splitting is referred to as a multi-grid splitting. In a multi-grid splitting, each odd element and its subsequent even neighbor in a vector are averaged to generate a new element and the new elements are combined to create a new vector. This process is repeated on the new vector and subsequent new vectors until a vector of only a single element (i.e., a scalar) is generated. For example, as shown in FIG. 7B, in vector 703, elements 1 and 2 are averaged, elements 3 and 4 are averaged, element 5 and 6 are averaged, and elements 7 and 8 are averaged. The result of each of these average operations is placed in a vector 705. In vector 705, elements 1 and 2 are averaged and elements 3 and 4 are averaged, and the result of each of these average operations is placed in a vector 707. In vector 707, elements 1 and 2 are averaged to generate vector 709 (a scalar). Each vector (i.e., 703, 705, 707, and 709) may be stored on a different processor.

Another example of splitting is a splitting of a spreadsheet, such as an Excel™, that is stored on the parallel server. That is, for example, if the spreadsheet has multiple sheets, each sheet may be stored on a processor of the parallel server. Alternatively, a single sheet in a spreadsheet may be row-split or column-split among the processors of the parallel server.

The illustrative splittings described above are only a few examples of splittings that may be used in various embodiments. The invention is not limited to these splittings, as any suitable splitting may be used.

Figure 6:
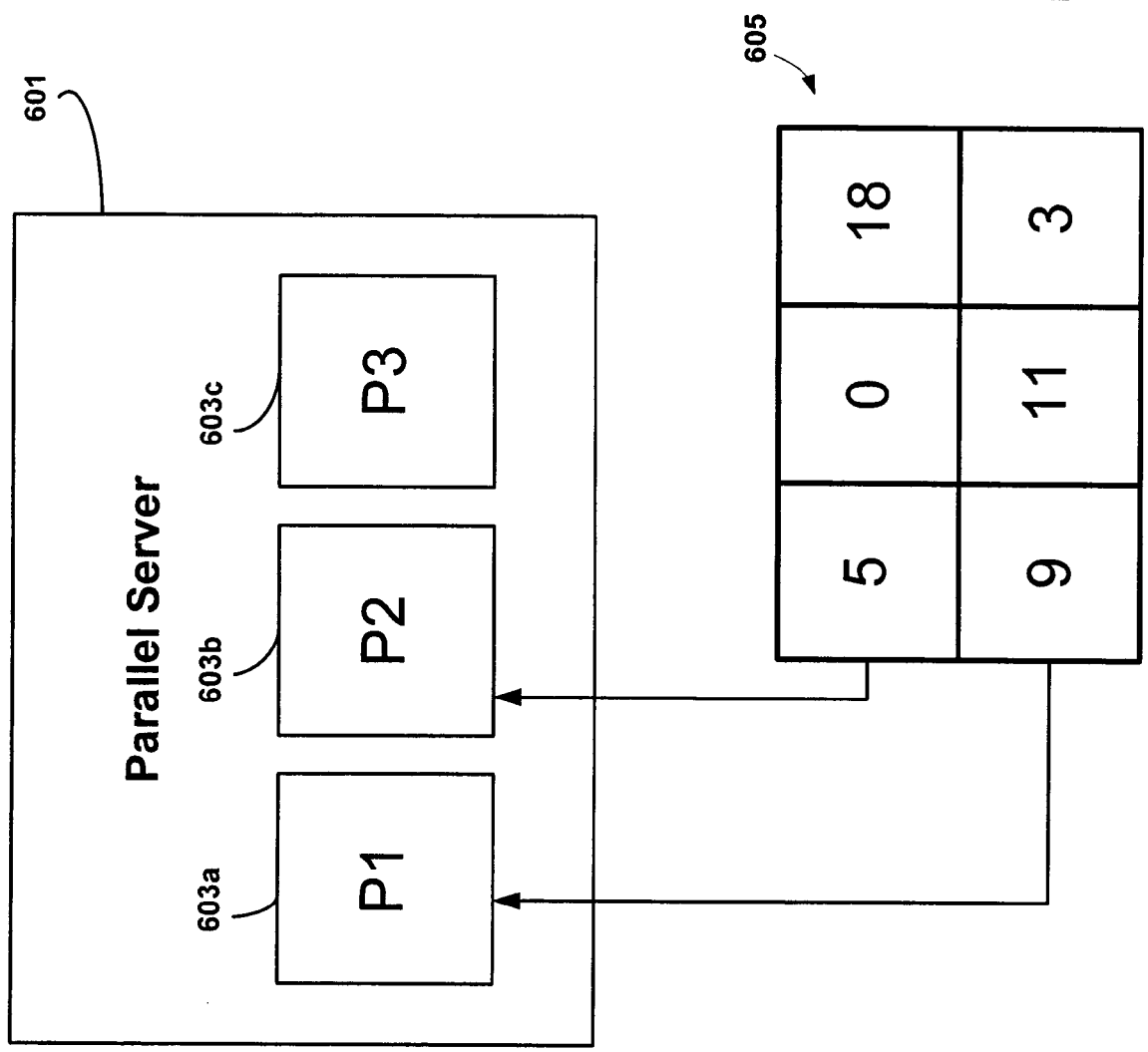
FIG. 6 is a block diagram of a matrix row-distributed on a parallel server.

As discussed in connection with the examples above, a user may specify a manner in which data is to be split amongst the processors of the parallel server and an operation for each processor to perform on its portion of the data. In some embodiments, the parallel server may not physically distribute the data in the manner specified by the user, but rather the may maintain an abstract splitting of the data. For example, as shown in FIG. 6, parallel server 601 may have three physical processors: 603a, 603b, and 603c. Matrix 605 is a 2×3 matrix that is physically row-distributed on processors 603a and 603b of parallel server 601. That is, the first row of matrix 605 is stored on processor 603b and the second row of matrix 605 is stored on processor 603a. A user's program may include the line of code shown in Table 7 which when executed causes the data referenced by the object 'C' (i.e., matrix 605 in this example) to be column distributed and the 'avg' routine to be run on each processor using each respective processor's column of matrix 605 as input to the 'avg' routine. Rather than physically redistribute the data such that each of physical processors 603a, 603b, and 603c stores one column of matrix 605, matrix 605 may remain physically row-distributed on processors on 603a and 603b. However, both the user and the parallel server may treat and operate on matrix 605 as if it were column-distributed over three processors. As discussed above, this is referred to as an abstract splitting and the three processor over which the matrix is abstractly split may be viewed as abstract processors. Though the user need only be aware of the abstract splitting, the parallel server is aware of both the abstract splitting and the underlying physical distribution of the data and may perform operations on the physical data using the physical processors such that the user's desired result of the operation or operations using the abstract splitting among the abstract processors is achieved. This may be done in any suitable way, as the invention is not limited in this respect.

For example, referring to FIG. 6, the parallel server may achieve the user's desired result of the operation in Table 7 (i.e., averaging the elements in each column of the Matrix C) as follows. Processor 603a may send the first element of its row (i.e., "9") to processor 603b, which may use the first element from row 2 received from processor 603b and the first element from row 1 (i.e., "5") stored thereon as input to the 'avg' routine which is executed on processor 603b. The output of the 'avg' routine may be stored on processor 603b. Processor 603a may then send the second element of its row to processor 603b, which may then execute the 'avg' routine again using the second element of row 2 received from processor 603a and the second element of row 1 stored thereon as input to the 'avg' routine and may store the result. Processor 603a may then send the third element of its row to processor 603b, which may then execute the 'avg' routine for a third time using the third element of row 2 received from processor 603a and the third element of row 1 stored thereon as input to the 'avg' routine and may store the result.

Thus, from the perspective of the user, matrix 605a is column-distributed across three processors, though the physical distribution of the data is a row distribution across two processors. In addition, the parallel server may return a pointer or a handle that the client may use to access the abstract matrices resulting from the performance of the operation indicated in Table 7. This pointer or handle may be stored in the object D, as shown in Table 7.

TABLE 7

D = ppeval('avg', split(C,2));

As discussed above, the ppeval function in Table 5 causes a command to be sent to the parallel server to column-distribute the data of the matrix referenced by the variable C and to execute the 'avg' routine on each processor that stores a portion of the matrix, using the portion of the matrix stored on that processor as input to the routine. In the example of Table 5, the result of running the 'avg' routine on a column of the column-distributed matrix is a scalar that is the average of the values in the column. That is, the result of the ppeval function is that each of the three processors that stores a column of the matrix referenced by the variable C also stores a scalar that is the average of the values in the column stored by the processor.

Figure 5:
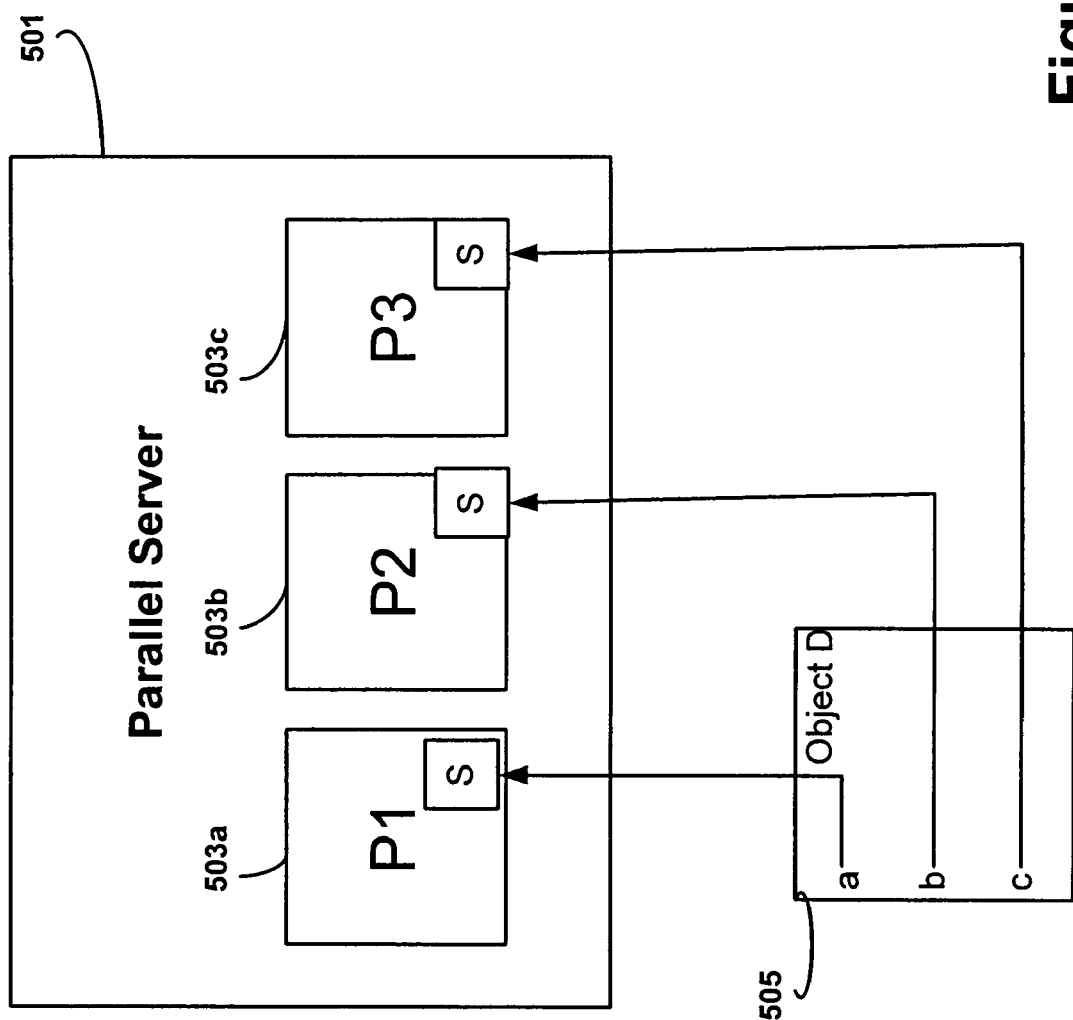
FIG. 5 is a block diagram of an object that reference local data in accordance with the methods and systems as taught herein.

In some embodiments, the ppeval function returns an object that includes a reference to each of the local pieces of the output of the function specified in the first argument of the ppeval function. Thus, in the example of Table 5, the object D includes a reference to each of the outputs of the 'avg' function. That is, the object D includes a reference to each scalar output by the 'avg' function that is stored on one of the three processors on which the 'avg' function was executed. For example, as shown in FIG. 5, parallel server 501 may have three processors 503a, 503b, and 503c. Each of these processors may store a scalar that is the output of the 'avg' function. Object D 505, which is returned by the ppeval function, may include a reference to each of the scalars.

As shown in Table 5, the user may manipulate and operate on the local data (i.e., the scalars) using the reference to the data in the object D. For example, the line of code D.a=D.a+1 causes processor 503a to add one to the value of the scalar stored thereon. Similarly, the line of code D.b=D.b+1 causes processor 503b to add one to the value of its scalar and the line of code D.c=D.c+1 causes processor 503c to add one to the value of its scalar.

The user may subsequently join the local pieces into a global object and operate on the global object using a global view. This may be done in any suitable way, as the invention is not limited in this respect. For example, as shown in Table 5, the line of code "E=ppjoin(D, 3, 1)" joins the local pieces referenced by the object the D and creates a global object, E, that references the matrix resulting from joining the scalars referenced by the object D. The function ppjoin is a function that causes a command to be sent to the parallel server to join local pieces into a global object. In the example of Table 5, the ppjoin function takes three arguments. The first argument is the object that references the local pieces (in this example, object D). The second and third arguments are the dimensions of the global matrix into which the object will be reconstituted. Thus, in the example of Table 5, the data of referenced by the object D may be joined in a 3×1 matrix.

In the example in Table 5 a user selects whether an operation is to be performed globally or locally. However, the invention is not limited in this respect, as in some embodiments, the decision whether to perform an operation globally or locally may be made automatically. This may be done in any suitable way, as the invention is not limited in this respect. For example, a pre-processor may recognize serial portions of a user's program that are suited for parallel local operation and cause these portions to be executed locally in parallel, rather than serially. For example, as shown in Table 8, rather than execute the "while" loop five times serially on a single processor, the pre-processor may recognize that the five iterations of the "while" loop may be performed in parallel and may cause five processors of the parallel server to each perform the operation a[n]=b*n in parallel, each using a different value of n (i.e., where n is 0 through 4).

TABLE 8

```
n=1;
while (n < 6){
    a[n] = b*n;
    n = n + 1;
}
```

The embodiments described above may incorporate any or all of the above-described aspects of the invention. Further, the above-described embodiments of the invention are not mutually exclusive of each other, such that any feature or aspect of one embodiment may be used in any other embodiment.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. Further, when the embodiments are implemented in software, such software may be accessed via download over a network.

It should be appreciated that one implementation of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user and/or via external electrical connection).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of processing a computer program that manipulates a data structure stored on a parallel server comprising a plurality of processors, wherein a portion of the data structure is stored on each of the plurality of processors, and wherein the method comprises acts of:
    (a) executing a first routine based on code in the computer program that causes a first request to perform a first operation on the data structure to be sent to the parallel server, wherein the first routine is a routine that overloads a serial routine that, when executed, causes the first operation to be performed serially; and
    (b) executing a second routine based on code in the computer program that causes a second request to be sent to the parallel server, wherein the second request specifies an abstract splitting of the data structure, and wherein the second request includes an instruction to at least one specific processor of the plurality of processors to perform a second operation on the portion of the data structure stored on the at least one specific processor.

2. The method of claim 1, wherein the computer program is written in an interpreted programming language.

3. The method of claim 1, wherein the computer program is written in a compiled programming language.

4. The method of claim 1, wherein the computer program is a first computer program and the second request includes a second computer program that, when executed on the at least one specific processor, performs the second operation on the portion of the data structure stored on the at least one specific processor.

5. The method of claim 4, wherein the first computer program and the second computer program are written in a same programming language.

6. The method of claim 4, wherein the first computer program and the second computer program are written in different programming languages.

7. The method of claim 1, wherein the parallel server includes at least one processor in addition to the plurality of processors.

8. The method of claim 1, wherein the first routine begins execution before the second routine.

9. The method of claim 1, wherein the second routine begins execution before the first routine.

10. The method of claim 1, wherein the plurality of processors are abstract processors.

11. At least one computer readable medium encoded with instructions that, when executed on a computer system, perform a method of processing a computer program that manipulates a data structure stored on a parallel server comprising a plurality of processors, wherein a portion of the data structure is stored on each of the plurality of processors, and wherein the method comprises acts of:
 (a) executing a first routine based on code in the computer program that causes a first request to perform a first operation on the data structure to be sent to the parallel server, wherein the first routine is a routine that overloads a serial routine that, when executed, causes the first operation to be performed serially; and
 (b) executing a second routine based on code in the computer program that causes a second request to be sent to the parallel server, wherein the second request specifies an abstract splitting of the data structure, and wherein the second request includes an instruction to at least one specific processor of the plurality of processors to perform a second operation on the portion of the data structure stored on the at least one specific processor.

12. The at least one computer readable medium of claim 11, wherein the computer program is written in an interpreted programming language.

13. The at least one computer readable medium of claim 11, wherein the computer program is written in a compiled programming language.

14. The at least one computer readable medium of claim 11, wherein the computer program is a first computer program and the second request includes a second computer program that, when executed on the at least one specific processor, performs the second operation on the portion of the data structure stored on the at least one specific processor.

15. The at least one computer readable medium of claim 14, wherein the first computer program and the second computer program are written in a same programming language.

16. The at least one computer readable medium of claim 14, wherein the first computer program and the second computer program are written in different programming languages.

17. The at least one computer readable medium of claim 11, wherein the parallel server includes at least one processor in addition to the plurality of processors.

18. The at least one computer readable medium of claim 11, wherein the first routine begins execution before the second routine.

19. The at least one computer readable medium of claim 11, wherein the second routine begins execution before the first routine.

20. The at least one computer readable medium of claim 11, wherein the plurality of processors are abstract processors.

21. A computer that executes a computer program for manipulating a data structure stored on a parallel server comprising a plurality of processors, wherein a portion of the data structure is stored on each of the plurality of processors, and wherein the computer comprises:
 an output for sending data to the parallel server; and
 at least one controller, coupled to the output that:
 (a) executes a first routine based on code in the computer program that causes a first request to perform a first operation on the data structure to be sent to the parallel server, via the output, wherein the first routine is a routine that overloads a serial routine that, when executed, causes the first operation to be performed serially; and
 (b) executes a second routine based on code in the computer program that causes a second request to be sent to the parallel server, via the output, wherein the second request specifies an abstract splitting of the data structure, and wherein the second request includes an instruction to at least one specific processor of the plurality of processors to perform a second operation on the portion of the data structure stored on the at least one specific processor.

22. The computer of claim 21, wherein the computer program is written in an interpreted programming language.

23. The computer of claim 21, wherein the computer program is written in a compiled programming language.

24. The computer of claim 21, wherein the computer program is a first computer program and the second request includes a second computer program that, when executed on the at least one specific processor, performs the second operation on the portion of the data structure stored on the at least one specific processor.

25. The computer of claim 24, wherein the first computer program and the second computer program are written in a same programming language.

26. The computer of claim 24, wherein the first computer program and the second computer program are written in different programming languages.

27. The computer of claim 21, wherein the parallel server includes at least one processor in addition to the plurality of processors.

28. The computer of claim 21, wherein the first routine begins execution before the second routine.

29. The computer of claim 21, wherein the second routine begins execution before the first routine.

30. The computer of claim 21, wherein the plurality of processors are abstract processors.

31. A method of processing a computer program written in an interpreted programming language that manipulates a data structure stored on a parallel server comprising a plurality of processors, wherein a portion of the data structure is stored on each of the plurality of processors, and wherein the method comprises acts of:
 (a) executing a first routine based on code in the computer program that causes a first request to perform a first operation on the data structure to be sent to the parallel server; and
 (b) executing a second routine based on code in the computer program that causes a second request to be sent to the parallel server, wherein the second request specifies an abstract splitting of the data structure, and wherein the second request includes an instruction to at least one specific processor of the plurality of processors to perform a second operation on the portion of the data structure stored on the at least one specific processor.

32. The method of claim 31, wherein the computer program is a first computer program and the second request includes a second computer program that, when executed on the at least one specific processor, performs the second operation on the portion of the data structure stored on the at least one specific processor.

33. The method of claim 32, wherein the first computer program and the second computer program are written in a same programming language.

34. The method of claim 32, wherein the first computer program and the second computer program are written in different programming languages.

35. The method of claim 31, wherein the parallel server includes at least one processor in addition to the plurality of processors.

36. The method of claim 31, wherein the first routine begins execution before the second routine.

37. The method of claim 31, wherein the second routine begins execution before the first routine.

38. The method of claim 31, wherein the plurality of processors are abstract processors.

39. At least one computer readable medium encoded with instructions that, when executed on a computer system, perform a method of processing a computer program written in an interpreted programming language that manipulates a data structure stored on a parallel server comprising a plurality of processors, wherein a portion of the data structure is stored on each of the plurality of processors, and wherein the method comprises acts of:
   (a) executing a first routine based on code in the computer program that causes a first request to perform a first operation on the data structure to be sent to the parallel server; and
   (b) executing a second routine based on code in the computer program that causes a second request to be sent to the parallel server, wherein the second request specifies an abstract splitting of the data structure, and wherein the second request includes an instruction to at least one specific processor of the plurality of processors to perform a second operation on the portion of the data structure stored on the at least one specific processor.

40. The at least one computer readable medium of claim 39, wherein the computer program is a first computer program and the second request includes a second computer program that, when executed on the at least one specific processor, performs the second operation on the portion of the data structure stored on the at least one specific processor.

41. The at least one computer readable medium of claim 40, wherein the first computer program and the second computer program are written in a same programming language.

42. The at least one computer readable medium of claim 40, wherein the first computer program and the second computer program are written in different programming languages.

43. The at least one computer readable medium of claim 39, wherein the parallel server includes at least one processor in addition to the plurality of processors.

44. The at least one computer readable medium of claim 39, wherein the first routine begins execution before the second routine.

45. The at least one computer readable medium of claim 39, wherein the second routine begins execution before the first routine.

46. The at least one computer readable medium of claim 39, wherein the plurality of processors are abstract processors.

47. A computer that executes a computer program written in a interpreted programming language for manipulating a data structure stored on a parallel server comprising a plurality of processors, wherein a portion of the data structure is stored on each of the plurality of processors, and wherein the computer comprises:
   an output for sending data to the parallel server; and
   at least one controller, coupled to the output that:
   (a) executes a first routine based on code in the computer program that causes a first request to perform a first operation on the data structure to be sent to the parallel server, via the output; and
   (b) executes a second routine based on code in the computer program that causes a second request to be sent to the parallel server, via the output, wherein the second request specifies an abstract splitting of the data structure, and wherein the second request includes an instruction to at least one specific processor of the plurality of processors to perform a second operation on the portion of the data structure stored on the at least one specific processor.

48. The computer of claim 47, wherein the computer program is a first computer program and the second request includes a second computer program that, when executed on the at least one specific processor, performs the second operation on the portion of the data structure stored on the at least one specific processor.

49. The computer of claim 48, wherein the first computer program and the second computer program are written in a same programming language.

50. The computer of claim 48, wherein the first computer program and the second computer program are written in different programming languages.

51. The computer of claim 47, wherein the parallel server includes at least one processor in addition to the plurality of processors.

52. The computer of claim 47, wherein the first routine is executed before the second routine.

53. The computer of claim 47, wherein the second routine is executed before the first routine.

54. The computer of claim 47, wherein the plurality of processors are abstract processors.

55. A method of processing a computer program that manipulates a data structure stored on a parallel server comprising a plurality of processors, wherein a portion of the data structure is physically stored on each of the plurality of processors, and wherein the method comprises acts of:
   (a) executing a first routine based on code in the computer program that causes a first request to perform a first operation on the data structure to be sent to the parallel server; and
   (b) executing a second routine based on code in the computer program that causes a second request to be sent to the parallel server, wherein the second request defines an abstract splitting of the data structure that defines a plurality of abstract portions of the data structure, and wherein the second request includes an instruction to perform a second operation on at least one of the plurality of abstract portions.

56. The method of claim 55, wherein the second routine begins execution before the first routine.

57. The method of claim 55, wherein the parallel server includes at least one processor in addition to the plurality of processors.

58. The method of claim 55, wherein the second operation takes as input the at least one of the plurality of abstract portions.

59. The method of claim 58, further comprising an act of:
   (c) in response to receiving the second request at the parallel server, performing the second operation on the at least one of the plurality of abstract portions without physically distributing the data structure on the parallel server in the manner of the abstract splitting.

* * * * *